W. R. GREEN.
UNIVERSAL TIRE CARRIER.
APPLICATION FILED DEC. 11, 1915, RENEWED JAN. 4, 1921.

1,403,158.

Patented Jan. 10, 1922.
4 SHEETS—SHEET 1.

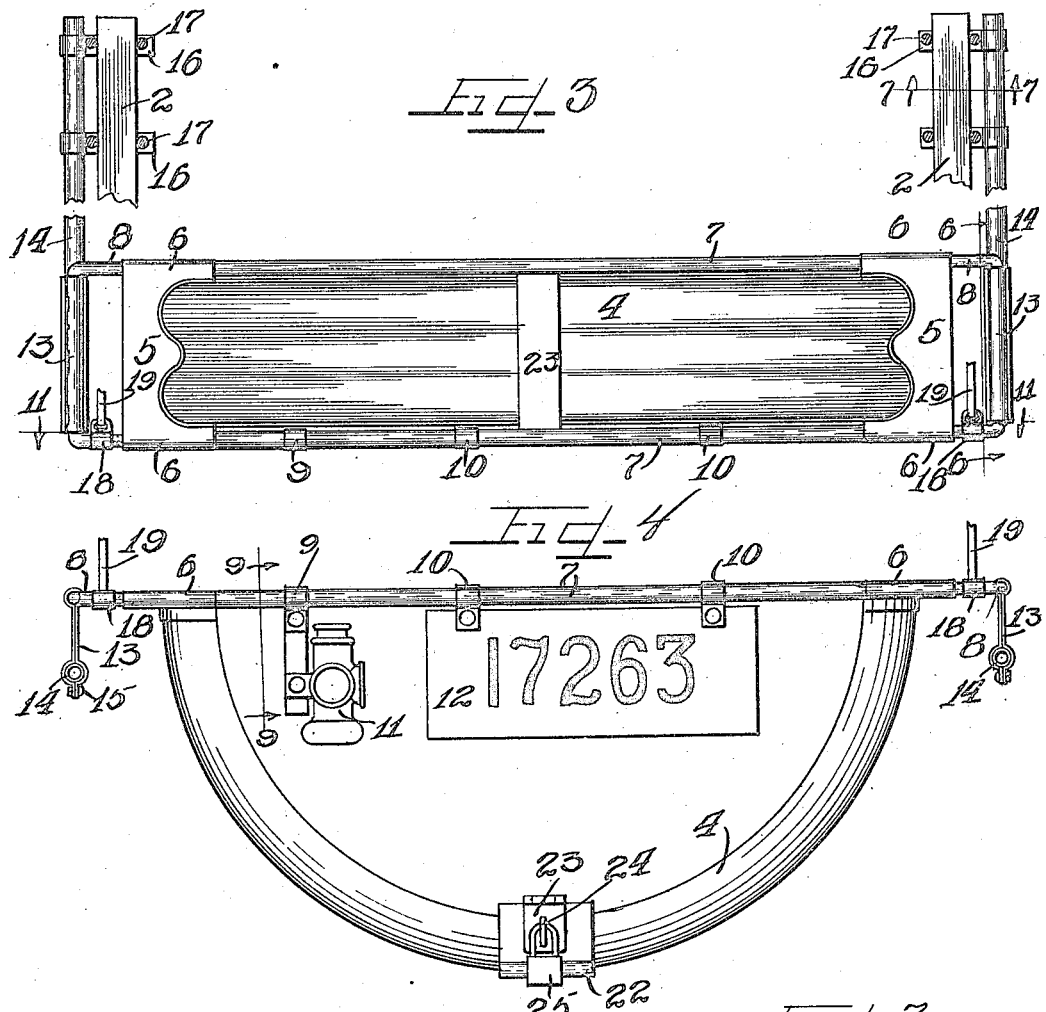

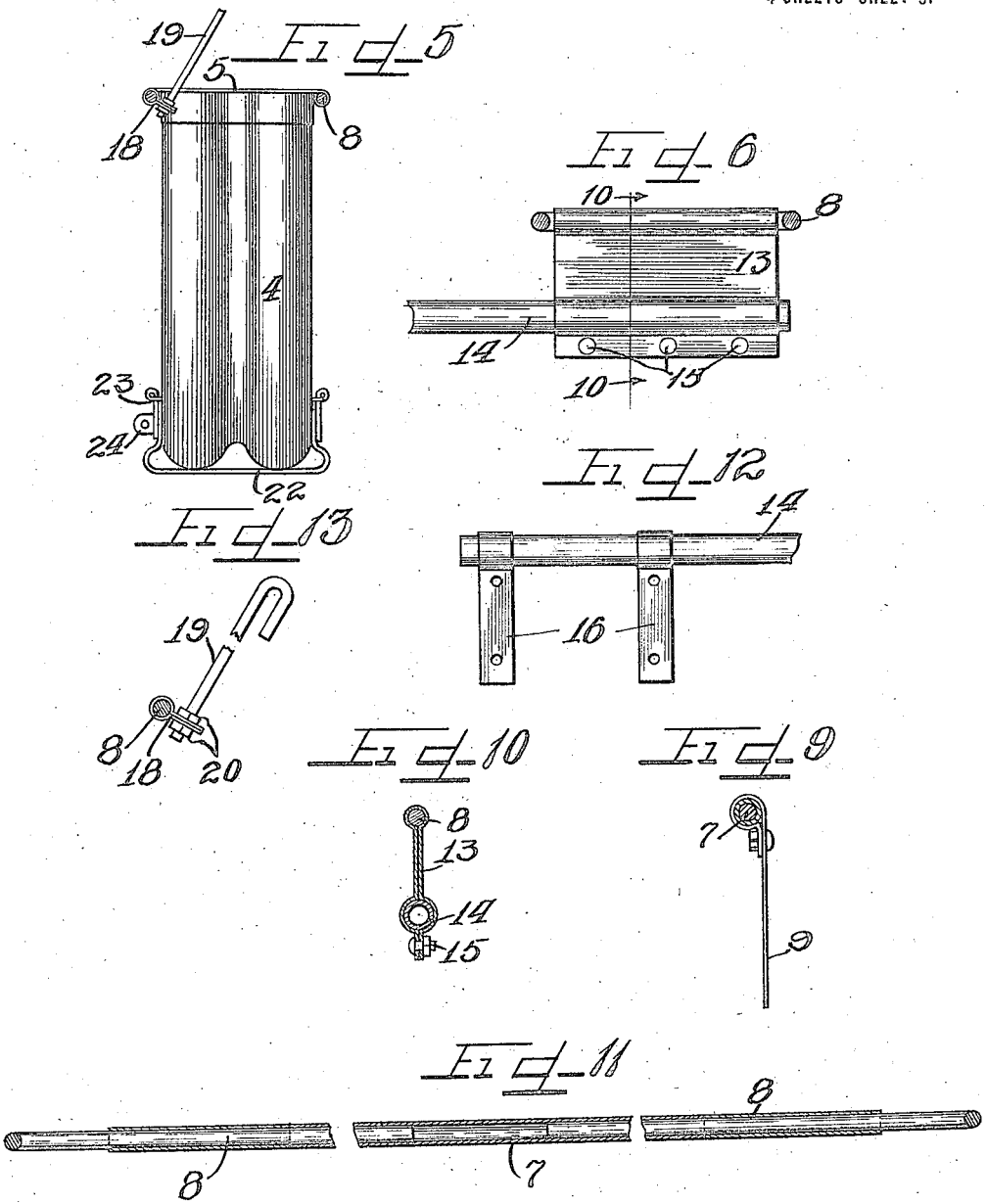

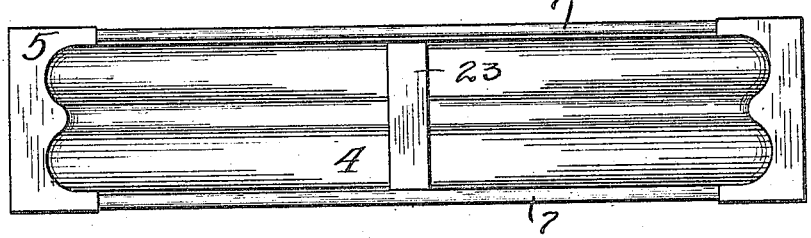
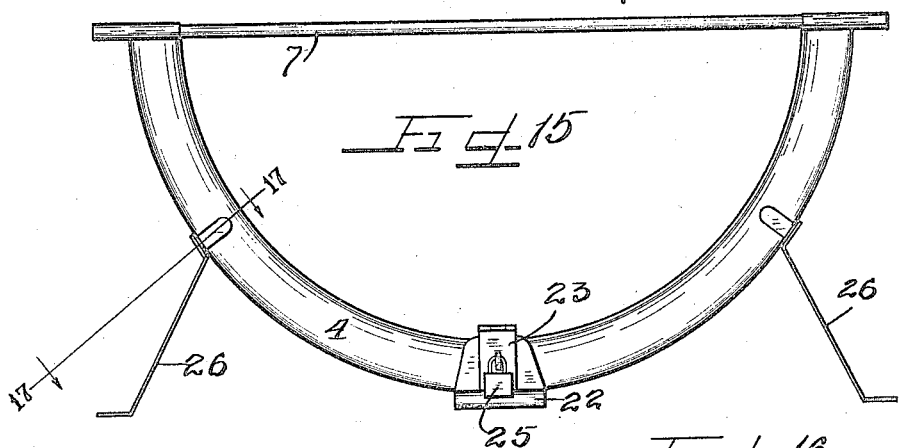
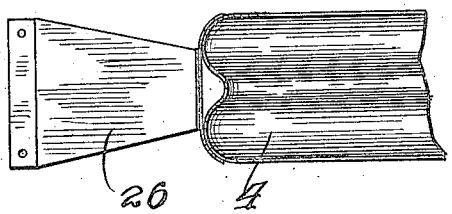
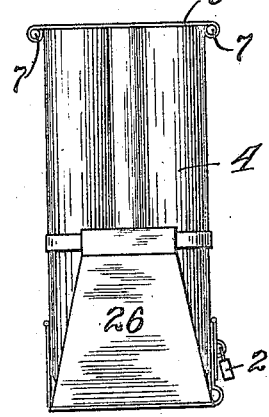

UNITED STATES PATENT OFFICE.

WALTER R. GREEN, OF CHICAGO, ILLINOIS.

UNIVERSAL TIRE CARRIER.

1,403,158. Specification of Letters Patent. Patented Jan. 10, 1922.

Application filed December 11, 1915, Serial No. 66,252. Renewed January 4, 1921. Serial No. 435,009.

*To all whom it may concern:*

Be it known that I, WALTER R. GREEN, a citizen of the United States, and a resident of the city of Chicago, in the county of Cook and State of Illinois, have invented certain new and useful Improvements in a Universal Tire Carrier; and I do hereby declare that the following is a full, clear, and exact description of the same, reference being had to the accompanying drawings, and to the numerals of reference marked thereon, which form a part of this specification.

This invention relates to an improved form of tire carrier which is universally adaptable to any type of motor car for connection thereon.

It is an object therefore of this invention to construct a tire carrier provided with attaching and supporting means capable of adjustment to adapt the tire carrier for connection on any type of motor car whereby the tire carrier is supported in rigid position at the rear of the motor car.

It is also an object of this invention to provide a tire carrier consisting of curved concave receiving channels adapted to receive a tire placed therein and with means for supporting the same connected at the point of connection of the springs with the chassis of the car and also with other portions of the body of the car to insure absolute rigidity and security of the device in position for use.

It is furthermore an object of this invention to construct an improved tire carrier comprising a curved grooved rigid frame adapted to receive one or more tires inserted into and locked therein, and with supporting and attaching bars adjustable with respect to said frame adapted for connection to the motor car to rigidly support the frame securely in upright position at the rear end of a motor car.

It is finally an object of this invention to construct an improved type of rigid tire carrier with the supporting connections therefor adjustable for different types of motor cars.

The invention (in a preferred form) is illustrated in the drawings and hereinafter more fully described.

In the drawings:

Figure 3 is a top plan view of the carrier detached from the motor car.

Figure 4 is an elevatioinal view thereof with parts broken away.

Figure 5 is an end view thereof with parts omitted.

Figure 6 is a fragmentary detail section taken on line 6—6 of Figure 3.

Figure 7 is a detail section on line 7—7 of Figure 3.

Figure 8 is a detail section on line 8—8 of Figure 7.

Figure 9 is a detail section on line 9—9 of Figure 4.

Figure 10 is a detail section on line 10—10 of Figure 6.

Figure 11 is a detail view partly in elevation and partly in section, taken on line 11—11 of Figure 3.

Figure 12 is a detail view of one of the attaching bars, showing in plan view the plates or clips which receive the spring U-bolts therethrough.

Figure 13 is a fragmentary detail view of one of the tension rods or tie rods connected between the carrier frame and the upper portion of the motor car body.

Figure 14 is a top plan view of the carrier adapted for use on a running board.

Figure 15 is a side view thereof.

Figure 16 is an end view thereof.

Figure 17 is a sectional view on line 17—17 of Figure 15.

As shown in the drawings:

Figure 1:
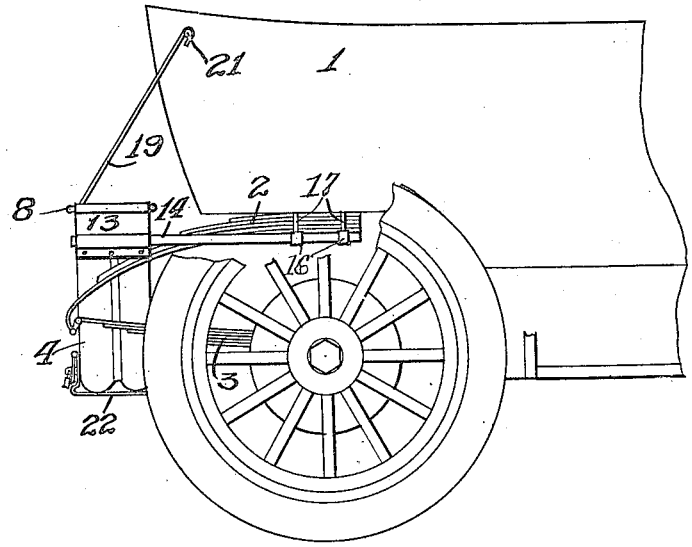
Figure 1 is a side elevation of the rear of a motor car equipped with a tire carrier embodying the principles of my invention.
Figure 2:
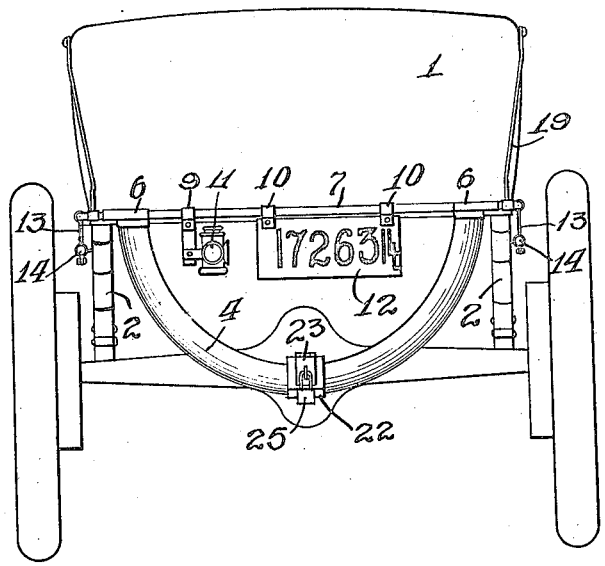
Figure 2 is a rear elevation of the motor car with parts omitted, showing the tire carrier in place.

The body of the motor car is indicated as a whole by the reference numeral 1, and the rear end thereof is supported as usual upon springs, in the present instance shown as three-quarter elliptic, having an upper section 2, and a lower section 3, the upper section 2, connected to the chassis frame or body 1, and the lower section 3, connected to the axle of the car. The carrier frame 4, in which the tires are placed to be carried, consists of a heavy curved sheet metal frame semi-circular in shape and stamped to afford two concave portions or grooves therein, for two tires. At its upper extremities, said carrier frame 4, has formed integral therewith or attached or brazed thereto in any suitable manner, flat plates 5, which are extended on each side of the carrier and with the margins rolled to afford tubes or sleeves 6, through which reinforcing pipe members or sections 7, are inserted, extending transversely or horizontally across the tire carrier at the upper end thereof. Telescoping into the ends of said pipe sections 7 are U-bars or rods 8, which may be held in any adjusted position therein by tightening the clip or bracket members 9 and 10 thereon, it being understood that the pipe section 7 on which said bracket members are mounted is split longitudinally for this purpose, as shown in Figure 9. As shown, the bracket member 9 is adapted to support a tail-light 11, while the bracket members 10 support a member plate 12.

Attached on said U-bars 8 and capable of swinging movement or adjustment thereon, are bracket pieces 13, each formed of a single sheet of metal folded over upon itself and stamped to afford a cylindrical sleeve through which the middle portion of one of the U-bolts 8, engages, and also provided with another cylindrical portion within which one of two round attaching or supporting rods 14, is inserted and held clamped in place by small bolts 15. Said rods or bars 14, serve to support the carrier in place upon the motor car, and for this purpose the shackle plates ordinarily used with the U-bolts on the springs of the motor car are replaced by plates 16, apertured to receive the U-bolts 17, by which the springs are attached to the motor car. As clearly shown in detail in Figures 7 and 8, said bars 16, at their ends are formed into eyes through which the ends of the respective rods 14, extend and are rigidly held, due to the clamping effect gained by attachment of said plates by the U-bolts.

Attached around said U-bars 8, at the outer side of the tire carrier, are small apertured clips 18, through which extend tie bars or rods 19, the threaded ends thereof being held rigidly connected to said clips by nuts 20, as shown in Figure 13, which, due to their clamping effect, also serve to clamp said clips upon the rods 8, while the other or upper end of each of said tie rods 19, has a hook formed thereon adapted to engage over a knob 21, secured in the body and which generally, in motor cars, forms a part of the bracket support of the bows for the folding top thereof.

A locking device is provided for locking tires which are placed into the carrier to prevent removal or theft thereof, and for this purpose a plate 22, is brazed beneath the outer surface of the carrier frame 4, with the ends thereof bent upwardly on each side of the frame, and connected on one of said upwardly bent ends is a hinged hasp 23, which is adapted to extend across the interior of the carrier frame 4, and outwardly and over an eye 24, provided on the other upwardly bent end of said plate, whereby a padlock 25, may be locked therethrough to lock the hasp in closed position.

In the modification of my invention illustrated in Figures 14 to 17 inclusive, I have shown the tire carrier constructed to be mounted upon the running board of an automobile. For this purpose, stays or brace plates 26, are attached by means of brazing or any suitable means to the frame 4, and are adapted to be attached to the running board of the motor car. Said stays or brace plates 26, serve to support and brace the carrier frame 4, in position on the running board. Of course many other methods for performing this function will suggest themselves to those skilled in the art, by the disclosure of my invention.

The operation is as follows:

In mounting the tire carrier it is only necessary to substitute the small plates 16, in place of the usual spring shackle plates and after attachment of the plates 16, beneath the springs by means of spring U-bolts 17, the supporting rods 14, are inserted through the eyes provided in said plates 16. The nuts on the spring-bolts 17, are then tightened up, thereby clamping the rods 14, rigidly in a position projecting horizontally and rearwardly from the motor car. The tire carrier is placed in position at the rear of the motor car and the outer end of said rods 14, inserted through the sleeve portions of the bracket plates 13, and due to the fact that the bracket plates 13, have an adjustable or pivotal connection with the U-rods 8, of the tire carrier frame and also due to the fact that said U-rods 8, have a telescoping engagement with said frame and may be extended therefrom if desired, the carrier can be properly centered and supported in position on the car. The bolts 15, are tightened up, thereby clamping said bracket plates 13, rigidly on the supporting rods 14, so that the carrier is held rigidly in position. A further additional support for the carrier to assist the rods 14, in supporting the same, is provided, consisting of the tie rods 19, which are connected at their lower ends by means of the clips 18, to the outer extensions of said U-rods 8, and have the upper ends thereof hooked over the knobs 21, provided on the body 1, of the motor car.

I am aware that the details of construction may be varied through a wide range without departing from the principles of this invention, and I therefore do not purpose limiting the patent granted otherwise than necessitated by the prior art.

I claim as my invention:

1. A tire carrier of the class described comprising a semi-circular frame to receive the tires placed therein, telescoping means thereon, supporting rods adjustably connected thereto adapted for connection at the inner end of the springs of the motor car, and tie rods connected at the outer end of said carrier and to the upper portion of the body of the motor car.

2. A tire carrier of the class described comprising a semi-circular frame adapted to receive tires placed therein, tubular members secured transversely across the upper end thereof to permit tires to be inserted therebetween, adjustable U-rods inserted in said tubular members, a bracket plate adjustably connected on each of said U-rods, and attaching rods adjustable in said bracket plates adapted to be connected to the motor car.

3. A tire carrier of the class described comprising a carrier frame, U-rods associated with the upper ends thereof and adjustable with respect thereto, supporting rods adjustably connected to said U-rods, and attaching clips adapted to be connected to the spring bolts of a motor car and to receive said supporting rods inserted therethrough.

4. In a device of the class described a carrier frame, telescoping means adjustably connected to the upper end thereof, attaching rods adjustably connected to said means, eye plates adapted to receive the ends of said attaching rods inserted therethrough and adapted to be connected by the spring bolts to the springs of the motor car.

5. The combination with a motor car, of a carrier attached thereon comprising a carrier frame, extensible means associated with said carrier frame, attaching rods adjustably connected to said extensible means, eyes formed on the spring shackles of the motor car, and said attaching rods inserted therethrough and rigidly held therein, and means connected to said extensible means and extending to the upper portion of the motor car body to assist in supporting the carrier in place thereon.

6. In a device of the class described a semi-circular concavely grooved carrier frame, transverse reinforcing members secured along the upper end thereof, extensible means mounted in said reinforcing members, attaching brackets adjustably connected to said extensible means, supporting rods adjustably connected to said brackets, and tie rods attached to said extensible means adapted to be connected to the body of the motor car.

7. A tire carrier of the class described comprising a curved frame member, tubular reinforcing means secured thereto, extensible members mounted in said reinforcing means, attaching rods adjustably connected to said members adapted to be connected to a motor car, and auxiliary mechanism connected to said extensible members adapted for connection at the upper portion of the motor car to assist in supporting the carrier in position thereon.

8. In a device of the class described, a tire carrier frame, telescoping means thereon, and interfitting members connected with said telescoping means for supporting the device on the springs of a vehicle.

9. In a device of the class described, a tire carrier frame, mechanism thereon for locking tires therein, telescoping means mounted on said frame, and interfitting means adjustably connected to said telescoping means adapted to support the device upon the springs of a vehicle.

10. In a tire carrier, a channel member for containing a tire, sleeves formed at the upper ends of said channel member, pipes connecting said sleeves, U-bars adjustably engaged in said pipes, a tail light clamp on one of said pipes, license plate clamps on said pipe, plates pivoted to said U-bars, and attaching rods adjustably connected to said plates.

11. In a tire carrier, a semi-circular concaved frame, a bar extending across the top of said frame and secured to the ends thereof, adjustable depending members secured to said bar, and attaching members adjustably secured to said depending members.

12. A tire carrier, comprising a tire supporting member, a bracket slidably adjustable in the plane of said supporting member, a depending clamping supporting member pivoted to said bracket to swing in the plane of said supporting member, and a support upon which said depending member is clamped adjustably.

13. A tire carrier, comprising a semi-circular frame concaved to receive tires placed therein, flat plates fixed to the upper ends of said frame and having their margins rolled to form sleeves, rigid elements fixed in and connecting said sleeves to brace said frame, and means for supporting said carrier upon a vehicle.

14. A tire carrier, comprising a semi-circular frame concaved to receive tires placed therein, flat plates fixed to the upper ends of said frame and having their margins rolled to form sleeves, tubes fixed in and connecting said sleeves to brace said frame, and means for supporting said carrier upon a vehicle.

In testimony whereof I have hereunto subscribed my name in the presence of two subscribing witnesses.

WALTER R. GREEN.

Witnesses:
CHARLES W. HILLS, Jr.,
EARL M. HARDINE.